Feb. 16, 1954   F. H. SCHNEIDER   2,669,645
AUXILIARY BROILING UNIT FOR RANGES
Filed Sept. 25, 1951   4 Sheets-Sheet 1
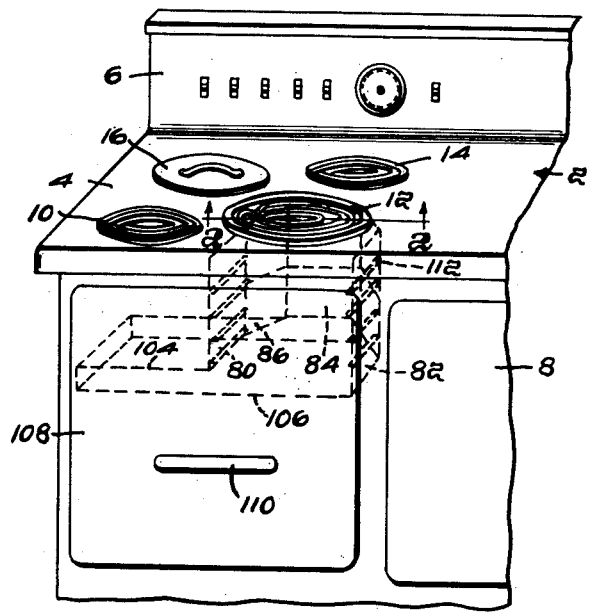
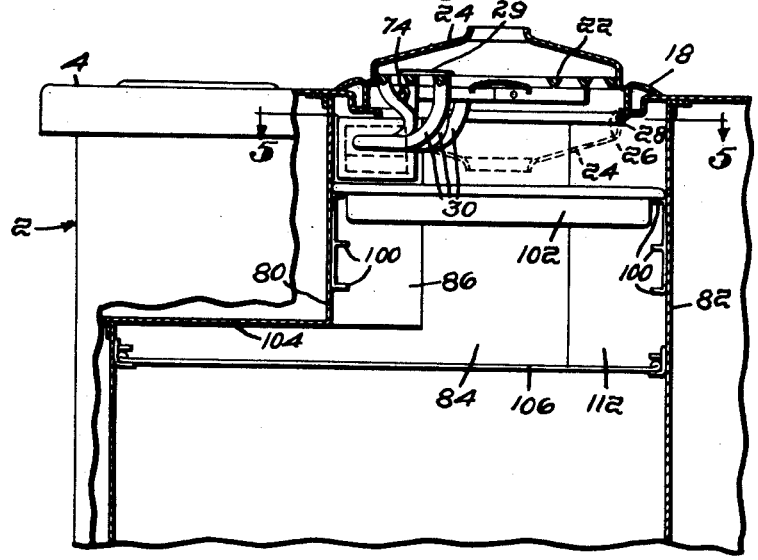
Inventor:
Frank H. Schneider
by Yardley Chittick
Attorney

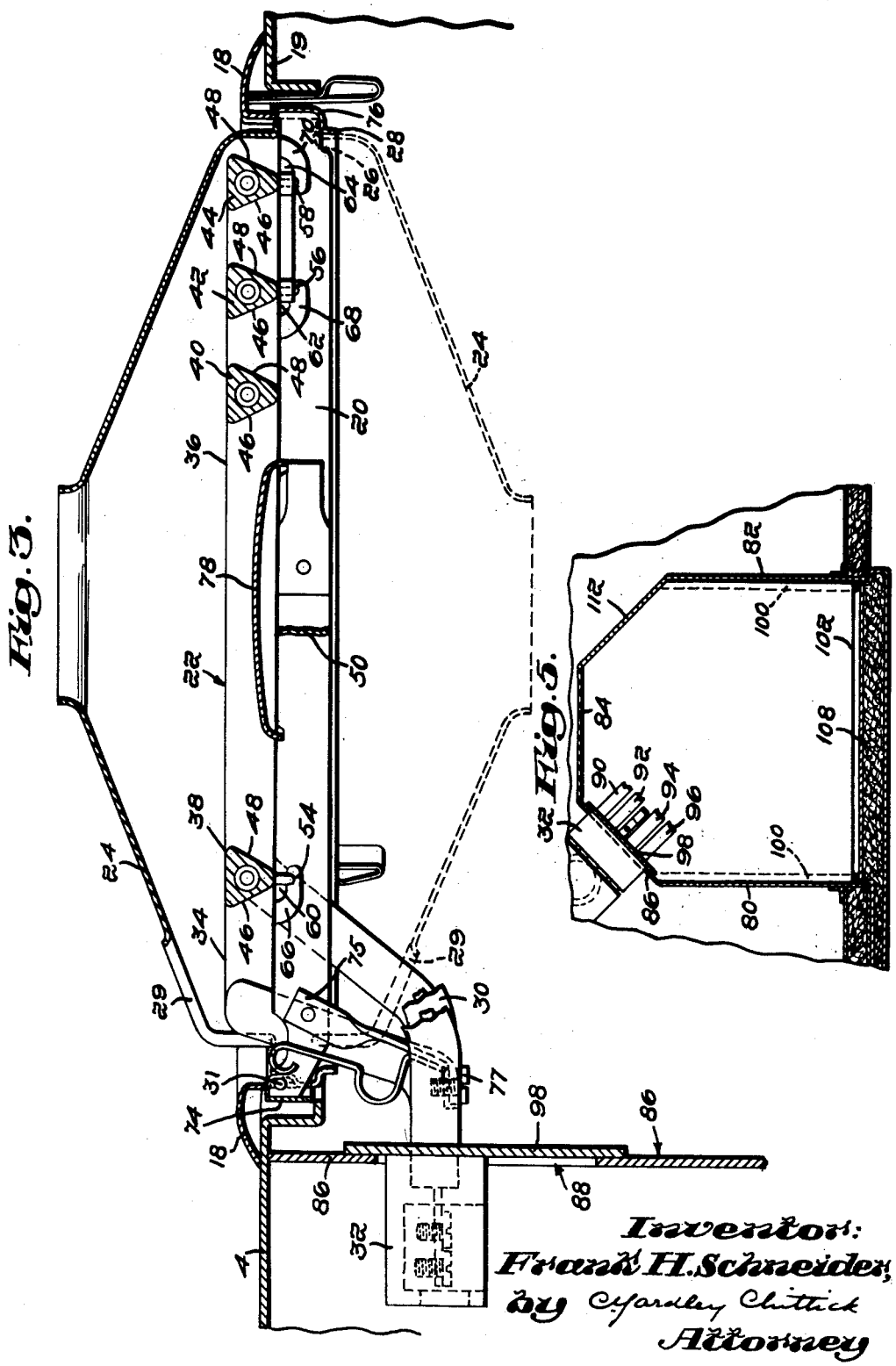

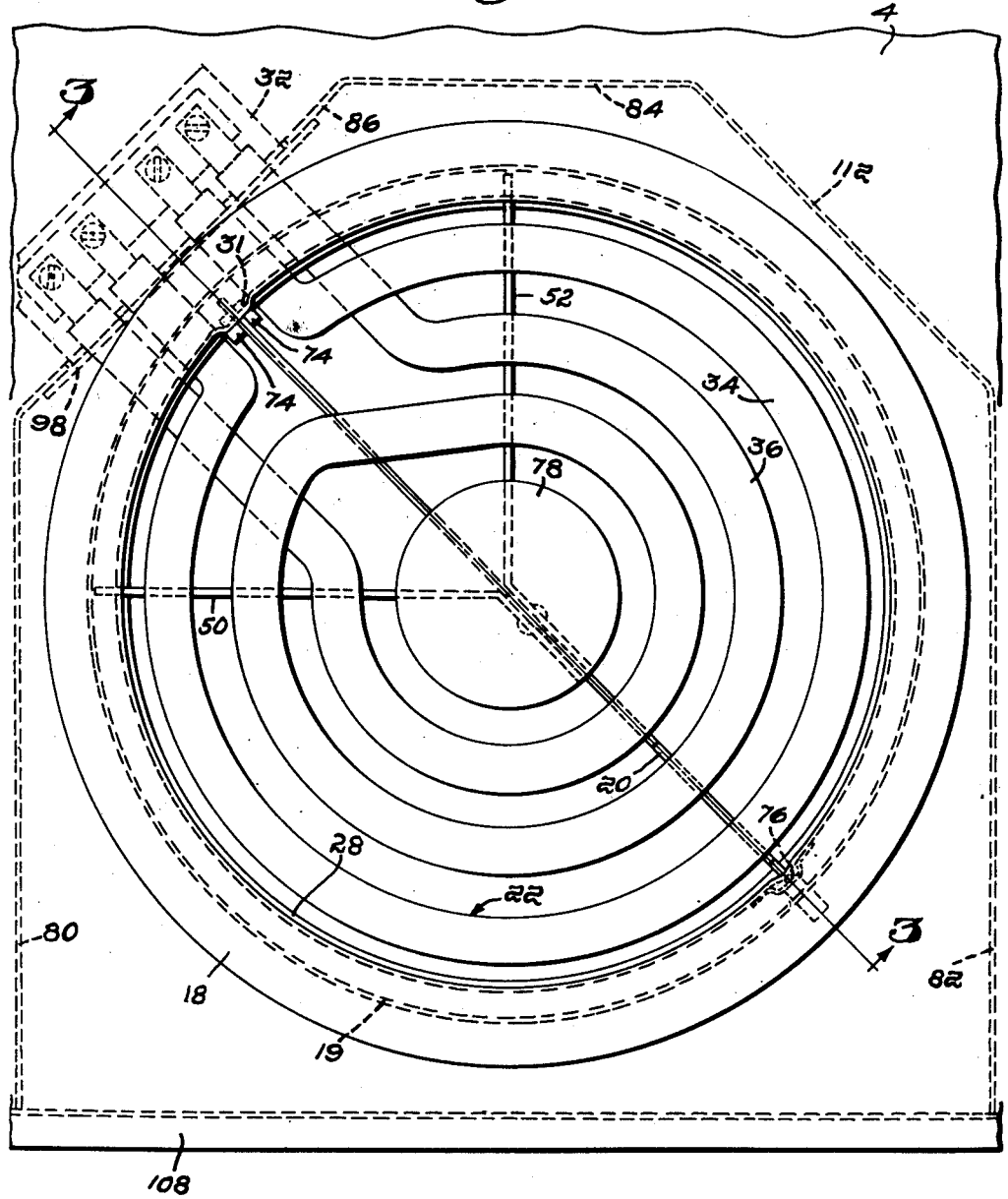

Feb. 16, 1954   F. H. SCHNEIDER   2,669,645
AUXILIARY BROILING UNIT FOR RANGES
Filed Sept. 25, 1951                                    4 Sheets-Sheet 4
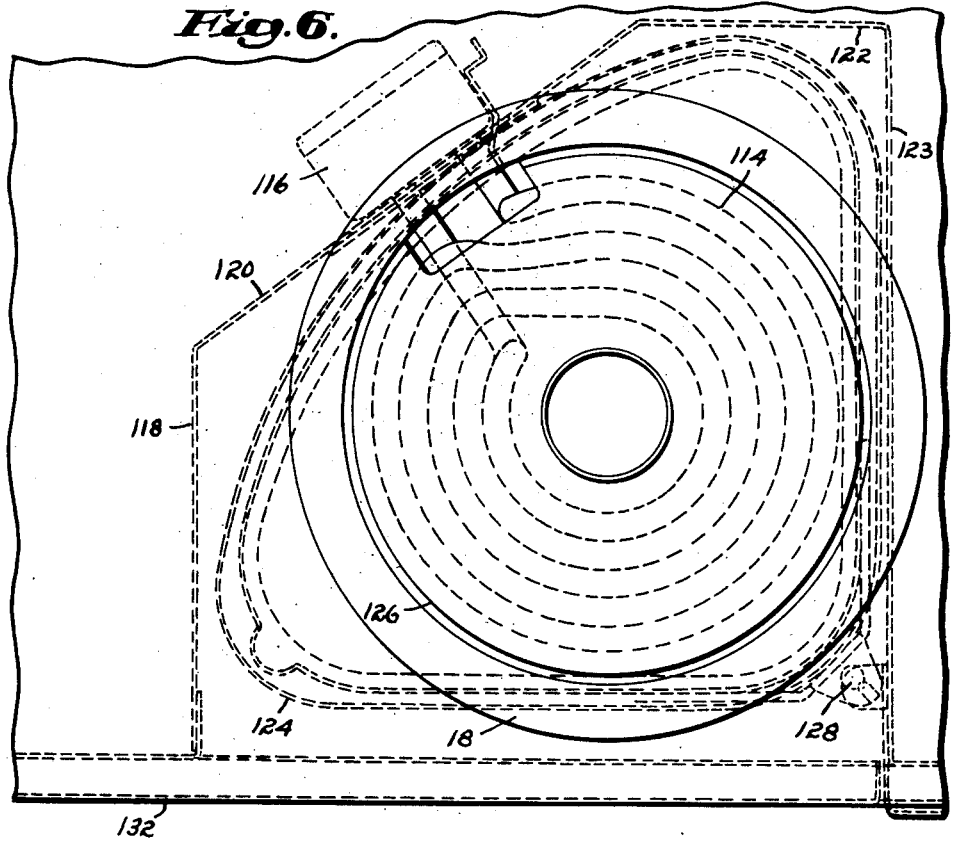
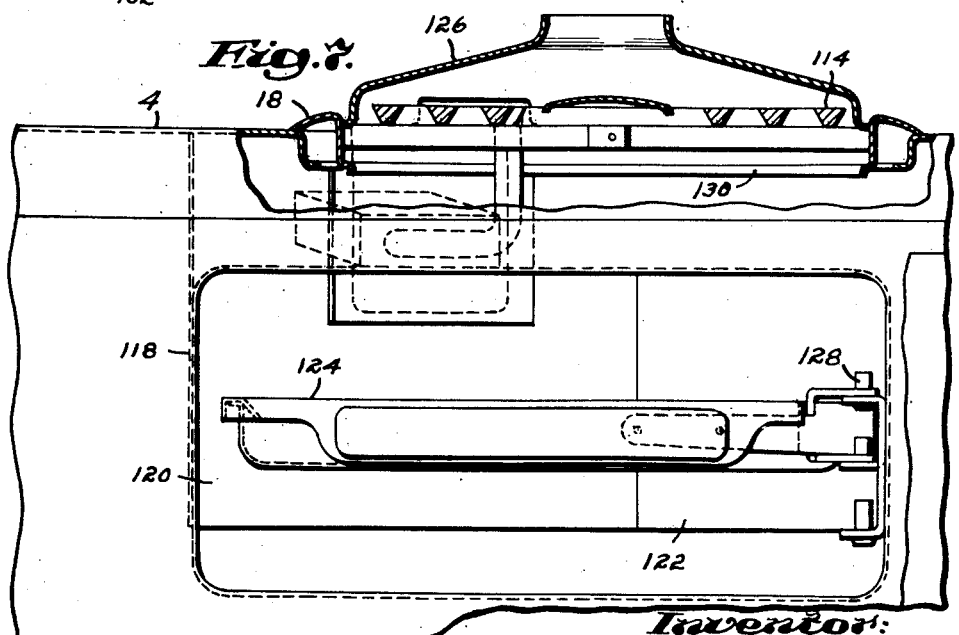
Inventor:
Frank H. Schneider,
by Chardley Chittick
Attorney Patented Feb. 16, 1954

2,669,645

UNITED STATES PATENT OFFICE 2,669,645

AUXILIARY BROILING UNIT FOR RANGES

Frank H. Schneider, Gardner, Mass., assignor to Florence Stove Company, Gardner, Mass., a corporation of Massachusetts Application September 25, 1951, Serial No. 248,193

5 Claims. (Cl. 219—35)

This invention relates to stoves and is particularly concerned with electric cooking ranges of the general type now in use in homes.

In the typical household electric range as now in use the broiling operation is conducted either in a separate full size broiling compartment or in a combination broiling and baking compartment. In general, the baking and broiling compartments are of substantial volume as they must be large enough to receive the largest conventional articles of food, such as, in broiling, for example, a large steak, and in baking, a large turkey. Because of the large volume in the baking and broiling compartments, considerable heat is required to heat these spaces even though the article to be broiled or baked may be relatively small. For example, in broiling one or two chops, in a broiler using electrical elements, far more current is used than is actually required for the cooking operation could the heat be more effectively applied. In other words, there are a great many small broiling operations that are conducted very inefficiently in the present large broiling compartment or combined broil and bake compartment.

Accordingly, it is an object of this invention to provide a small independent broiling compartment which will receive its heat from one of the existing surface cooking elements. The additional compartment will require no additional space, no extra elements will be necessary and the main broiling and baking compartment will remain undisturbed.

In order to accomplish the foregoing result, I contemplate utilizing one of the front surface cooking elements by making special provision for causing the heat of the element to be directed downwardly during broiling rather than upwardly as in normal surface cooking and at the same time providing a special small compartment under the cooking element which will be adapted to receive a broiling pan on which the smaller quantities of food may be placed.

Since the downward direction of heat from the cooking element will cause a high temperature in the broiling pan, and this heat would normally spread laterally under the top of the stove, I have also provided a special arrangement in the form of compartment walls and bottom which confine the heat to the small broiling area, thereby minimizing the temperature in the adjacent area under the other surface cooking elements. In this way, the electrical terminals and insulated wires will be protected from both high temperatures and the deposit thereon of fats and greases which high temperature broiling vapors normally carry.

The introduction of the above referred to small broiling compartment is accomplished without change in the general appearance of the exterior dimensions of the range.

These and other objects of the invention will become more apparent as the description proceeds with the aid of the accompanying drawings in which Fig. 1 is a front perspective of a portion of an electric range utilizing my invention showing in dotted lines the small broiling compartment located under the front right cooking element.

Fig. 2 is an enlarged front vertical section showing the cooking element arranged in broiling position with a broiling pan positioned thereunder. This section is on the line 2—2 of Fig. 1.

Fig. 3 is a still further enlarged vertical section of the cooking element shown in Fig. 2.

Fig. 4 is a plan view of Fig. 3, slightly reduced in size, showing the relationship of the cooking element to the broiling compartment walls.

Fig. 5 is a section taken on the line 5—5 of Fig. 2.

Fig. 6 is a plan view showing a single element cooking unit and a swing-away pan.

Fig. 7 is a front elevation of Fig. 6 with the cooking element in section and the door open to show the pan.

Referring to Fig. 1, there is shown an electric range 2 broken away at the right hand end. This range has a top 4, a back guard 6, a broiling and baking oven in the broken away right portion at 8 and surface electric cooking elements at 10, 12 and 14. A deep well cooking unit is indicated at 16 but this has no bearing on the present invention.

I have selected the cooking element 12 as the unit to be used to provide the heat for the broiling operation in my reduced size broiler. In the conventional construction of an electric cooking element which is shown in section in Figs. 2 and 3, it is customary to provide a heat reflector beneath the electric element for intensifying the upward heat that will be applied to the cooking utensil placed on the element's upper surface. This is desirable because the element being heated over its entire surface radiates heat downwardly as well as upwardly. By reflecting the initially downwardly directed heat upwardly, the surface cooking heat is considerably increased and efficiency and economy is improved.

The reflector normally used beneath the cooking element has generally been made removable for cleaning purposes and is of such size that it may be inverted and placed over the cooking element to reflect the upwardly directed heat of the element downwardly. It is because of this construction that I am enabled to produce sufficient heat below the cooking element to conduct broiling operations on a suitably located broiling pan. With this introductory explanation, I now refer to the drawings to explain the construction in greater detail.

In Figs. 2 and 3, the cooking element comprises a supporting circular rim 18 which rests on the circular edge 19 of the range top 4. A spider 20 carried by rim 18 supports an electric heating element generally referred to at 22, the various convolutions of which are shown more plainly in plan view in Fig. 4. The cooking element is of conventional construction and no change is made therein.

The reflector pan that is normally positioned below the cooking element when surface cooking is being conducted is indicated in dotted line at 24 with its upper outwardly extending lip 26 resting on in-turned lip 28 of rim 18. The reflector pan is cut away at one edge at 29 so as to permit the passage therethrough of the several leads 30 of the surface cooking elements. The spider supporting the cooking elements is pivoted at 31 to the rim in a manner which permits the cooking elements to be swung upwardly about the pivot so that reflecting pan 24 may be removed from its lower position on rim 18. After the reflecting pan has been removed, the cooking elements may then be returned to normal horizontal position and when in this position the reflecting pan 24 may then be placed in inverted position over the cooking elements as shown in solid lines in Figs. 2 and 3 in which position it is obvious that the heat will be reflected downwardly.

The cooking element shown in detail in Figs. 2, 3 and 4 comprises an insulating block 32 to which the wire leads are connected and from this block extends an exterior circular element 34 and an interior element 36 having two convolutions. The elements to facilitate heat transmission have been formed to triangular shape as can be seen in Fig. 2 at the cross sections 38, 40, 42 and 44. By having the top surface of each element flat the heat will be better transmitted to a flat pan resting thereon. However, it is apparent that each element has a greater exposed surface area facing in a downward direction than in an upward direction, that is, the area of the sloping under sides 46 and 48 of each of the elements is approximately twice the area of the top flat surface. The cooking element is always in the same position with respect to the range top when used for surface cooking or for broiling. That is to say, while the element may be swung upwardly about its pivot to a position above the range top to permit removal or insertion of the reflector pan, it is then returned to its original position.

The elements 34 and 36 are supported by the spider 20 which has two laterally extending legs 50 and 52. The elements are anchored to the spider legs by small loops 54, 56 and 58 which are hooked over fingers 60, 62 and 64 formed by cutaway portions of the spider as at 66, 68 and 70. The left hand end of the spider as viewed in Figs. 2, 3 and 4 is pivoted to rim 18 at 31 in such manner that the spider and attached elements may be swung upwardly to the left, pivoting thereabout as heretofore explained.

A leaf spring 74 permits slight movement to the left of spider 20 so that the right hand end thereof may be withdrawn from a shallow depression 76 in the vertical interior of rim 18 which serves as a latch to hold the spider horizontal when the heating elements are in normal position. Block 32 is secured to spider 20 by a metal strip 75 and the screw threaded connection 77. A central cover plate 78 is located inside the innermost heating element.

Depending from the top 4 of the range are two side walls 80 and 82 and a rear wall 84. Walls 80 and 84 are connected by a diagonal vertical wall 86 which is cut away near the top as at 88 to form an opening through which extends the terminal portions of elements 34 and 36 on their way to block 32. Surrounding the four lead portions 90, 92, 94 and 96 of elements 34 and 36 is a vertical plate 98 of a size adequate to overlap the edges of opening 88 through wall 86.

On the sides of walls 80 and 82 are a plurality of pan supporting elements 100 on which may be placed in slidable relation a broiling pan 102, all as illustrated in Fig. 2. The bottom of wall 80 is shown as being connected with a horizontal wall 104 but due to the substantial distance that wall 80 extends below the cooking element and due to its closeness to the drip or crumb pan 106, wall 104 may be omitted. That is, the protection afforded by wall 80 will in the ordinary situation be adequate to prevent undue heating of the space to the left thereof. The drip or crumb pan 106 closes the bottom of the special small broiling compartment that has just been described. The front opening of this compartment when in use is closed by a door 108 with handle 110, the door being hinged or on slides, as preferred.

As can be seen in Fig. 5, the right hand rear corner of walls 82 and 84 has been formed diagonally as at 112 to render the broiling compartment generally symmetrical at the rear. However, it will be understood that the shape of the compartment at the rear may be otherwise, as desired. That is, walls 82 and 84 might intersect at right angles or they might be joined by a curved corner. In general it may be said that it is preferable that the pan 102 will have its rear side formed to conform to whatever shape wall construction has been elected. However, since the rear of the pan is away from the broiling heat, no loss of efficiency is incurred regardless of the particular wall and pan formation.

From the foregoing description it will be clear that the area under the heating element 22 is an entirely confined area so that the hot gases therein may not spread laterally under the other adjacent surface burners nor can the high temperature in this area reach the block 32 and the various electric wires that lead into this block and to the other surface heating elements.

The operation of the unit is as follows. When normal cooking is to be carried on on the range top by cooking element 22, the reflector pan 24 will be in the dotted line position shown in Figs. 2 and 3 and of course it will be understood that under these conditions there will be no reflector pan above the heating coils. When it is desired to conduct a broiling operation using the small auxiliary broiler space herein provided, the user will first unlatch the right end of spider 20 from depression 76, and then swing the spider and heating elements upwardly to the left, close to the vertical. In this position, it becomes possible to remove the reflector pan 24 from the dotted line position of Figs. 2 and 3. With the reflector pan removed, the user first replaces the cooking elements in normal position and then places the reflector pan in inverted position over the cooking elements as shown in full line in Figs. 2 and 3.

Current is then turned on causing elements 34 and 36 to heat in the usual manner. Elements 34 and 36 having large exposed under areas 46 and 48 will direct substantial heat downwardly and the reflector pan 24 will increase this downward heat by reflecting downwardly the heat that flows from the top surfaces of elements 34 and 36. The total downward heat so produced is adequate for broiling. The user then places the food to be broiled on pan 102, selects the correct supporting level for the pan and slides the pan in under the cooking element, and allows the broiling to proceed.

According to the usual practice, the cooking element will have five or seven different heats so that the temperature may be controlled to produce the most satisfactory broiling heat.

The construction shown in Figs. 6 and 7 discloses a cooking element 114 formed of a single coil. Its terminals 116 are connected to the power source in the usual manner. The wall structure is somewhat differently arranged, having a side wall 118, a diagonal wall 120, a short rear wall 122 and a side wall 123. This construction permits the positioning therein of a swing-out pan 124, the body of which will be located directly below the cooking element 114 so that the heat of the element will be more efficiently distributed on the food in the pan.

The construction, as viewed in Fig. 7, is in general similar to that heretofore described. The reflector pan 126 overlies the cooking element and the swing-out pan 124 is carried by a pivotal support at 128. The pan may be shifted vertically by lifting it from one pair of pivots and placing it on another, either above or below. It is believed unnecessary to give further detailed description of the construction of Figs. 6 and 7 for they are basically similar to that shown in Figs. 1 to 5. Suffice to say, however, that the cooking element construction may be swung upwardly to permit the inverted insertion of reflector pan 126 on the rim 130 when it is desired to do surface cooking rather than broiling. There will, of course, be a door to the broiling space, as indicated at 132. This door is shown as open or removed in Fig. 7.

It will thus be seen that I have provided in a conventional range an auxiliary broiling compartment that utilizes an existing cooking element. No additional parts are needed other than the walls 80, 82, 84 and 86 as shown in Figs. 1 to 5 and walls 118, 120, 122 and 123 as shown in Figs. 6 and 7. These walls act to restrict dispersion of the broiling heat and fumes under range top 4. The restriction of the heat in the small broiling compartment operates to raise the temperature therein to speed the broiling operation.

While in the preferred form, as explained above, the reflector pan 24, shown in Figs. 1 to 4, and reflector pan 126, shown in Figs. 6 and 7, are interchangeable in that they may be used below the cooking element to reflect heat upwardly, and upon removal be inverted to be placed over the cooking element to reflect heat downwardly for the broiling operation, still it will be understood that if it is found more convenient, a separate reflector pan may be supplied for use in the broiling operation after the under reflector pan has been removed. This latter arrangement, of course, would require the use of two reflector pans as distinguished from a single pan in the preferred form.

It is also pointed out that the inclusion of a door for closing the compartment under the broiling element is not necessary. In the ordinary case, a door will normally be provided but since it is well understood that broiling can be conducted without having a closure at the front of the broiling compartment, the door may be omitted if desired.

When reference in the claims is made to the broiling compartment, it is intended to mean that space or area below the cooking element in which is positioned the pan carrying the food to be cooked.

It is my intention to cover all changes and modifications of the examples of the invention herein chosen for purposes of the disclosure which do not constitute departures from the spirit and scope of the invention.

I claim:

1. An electric range having a top and a non-invertible electric cooking element having a single operating position and located in an opening in said top and substantially flush therewith, said cooking element being pivoted to be swung upwardly above said range top, a removable reflector pan normally located under said element for surface cooking and removable from surface cooking position through said opening upon said element being swung upwardly and thereafter positioned over said cooking element when it is desired to use said cooking element as the source of heat for broiling, a broiling compartment beneath said cooking element, said compartment comprised of walls depending from said top, said walls separating the area below said cooking element from the remaining area under said top, an opening through the front of said range leading into said compartment, and an opening through one of said walls through which the lead portions of said element may move when said element is swung upwardly about said pivot.

2. An electric range as set forth in claim 1 and having in addition a closure plate for closing the opening in said wall when said cooking element is in normal cooking position.

3. An electric range having a top and a non-invertible electric cooking element having a single operating position and located in an opening in said top and being substantially flush therewith and having means permitting it to be swung upwardly above said top, a removable reflector pan normally located under said element for surface cooking and removable from said surface cooking position through said opening when said element has been swung upwardly and thereafter positioned over said cooking element when it is desired to use said cooking element as the source of heat for broiling, a broiling compartment beneath said top, said compartment comprised of walls depending from said top and separating the area below said cooking element from the remaining area under said top, said compartment walls including side and rear walls and another wall set at an angle to one of said side walls and said rear wall, an opening through said angled wall, leads to said cooking element passing through said opening and an opening through the front of said range leading into said compartment.

4. An electric range having a plurality of electric heating elements positioned for use as surface cooking elements, one of said elements being adapted in addition for use as a broiling element, the one said surface cooking and broiling element being located at the front of the range and substantially flush with the range top and directly above a small broiling compartment comprised of walls depending from said range top and segregating said compartment from adjacent areas under the other surface cooking elements, the one said surface cooking and broiling element being pivotally related to said range whereby said element can be swung upwardly above said range top, a reflector pan selectively positioned below the one said cooking and broiling element for surface cooking and above the one said cooking and broiling element for broiling, said reflector pan being removable from surface cooking position when said cooking and broiling element has been swung upwardly, a door for closing the front of said compartment and a removable cooking pan in said compartment.

5. An electric range having a major broiling compartment and a minor broiling compartment, both compartments having openings thereinto through the front of said range, the source of heat for said minor broiling compartment comprising a conventional electric cooking element having a single operating position and located in an opening in the range top substantially flush therewith and close to the front edge thereof and pivotally supported so as to be capable of being swung upwardly above said top and being, when in normal position, directly above said minor broiling compartment, said minor broiling compartment being formed by side and rear walls depending from said range top, and a reflector pan normally located below said cooking element and removable from said normal location when the said cooking element has been swung upwardly and thereafter to be positioned above said cooking element to increase the downwardly directed heat when the broiling operation is being conducted in said minor broiling compartment.

FRANK H. SCHNEIDER.

References Cited in the file of this patent

UNITED STATES PATENTS

| Number | Name | Date |
| --- | --- | --- |
| 2,291,857 | Woodman | Aug. 4, 1942 |
| 2,417,977 | French | Mar. 25, 1947 |
| 2,502,988 | Price | Apr. 4, 1950 |
| 2,519,051 | Kirk | Aug. 15, 1950 |
| 2,536,613 | Schulze et al. | Jan. 2, 1951 |
| 2,617,008 | Barnes | Nov. 4, 1952 |

FOREIGN PATENTS

| Number | Country | Date |
| --- | --- | --- |
| 485,603 | Great Britain | May 23, 1938 |